(No Model.)
J. W. TEETZEL.
LOCKING DEVICE FOR TUBE OR PIPE SECTIONS.
No. 400,513. Patented Apr. 2, 1889.
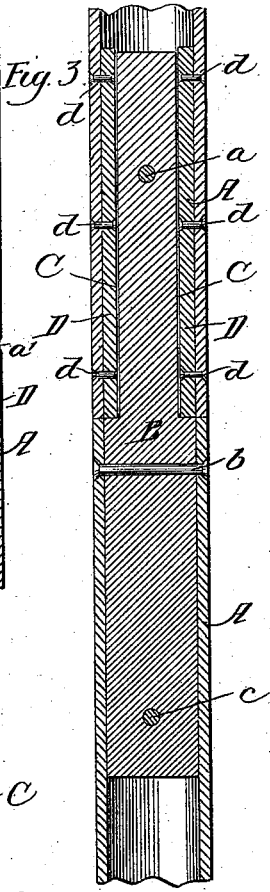
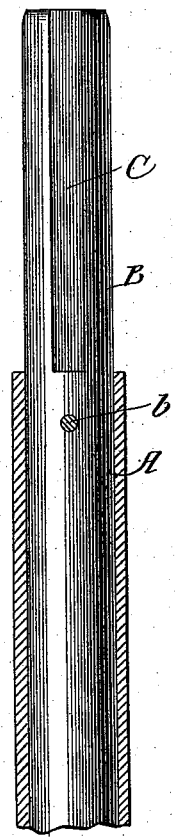
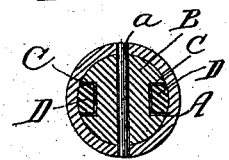
Witnesses:
Albert H. Adams.
Harry T. Jones.
Inventor:
John W. Teetzel
By West & Bond
Attys.

UNITED STATES PATENT OFFICE.

JOHN W. TEETZEL, OF OTTAWA, ILLINOIS.

LOCKING DEVICE FOR TUBE OR PIPE SECTIONS.

SPECIFICATION forming part of Letters Patent No. 400,513, dated April 2, 1889.

Application filed March 23, 1888. Serial No. 268,247. (No model.)

*To all whom it may concern:*

Be it known that I, JOHN W. TEETZEL, residing at Ottawa, in the county of La Salle and State of Illinois, and a citizen of the United States, have invented a new and useful Improvement in Locking Devices for Tube or Pipe Sections, of which the following is a specification, reference being had to the accompanying drawings, in which—

Figure 1 is a sectional elevation showing two sections of pipe and the plug. Fig. 2 is an elevation showing two sections of pipe joined. Fig. 3 is a sectional elevation showing the ends of two pipes joined. Fig. 4 is a cross-section through the joint. Fig. 5 is an end view of the connecting-plug.

This invention is primarily designed for use in connecting the sections of a drill tube or rod, but can be used for connecting other tubes or pipes where it is desired to have a firm connection with but little expense or trouble; and its nature consists in providing a plug adapted to fill the end of the tube or pipe at one end, and having its other end provided with recesses to receive splines or keys on the interior of the other pipe-section at the end.

In the drawings, A represents sections of pipes or tubes, the ends only of two adjoining sections being shown.

B is a plug having a diameter for half of its length, or nearly so, equal to the interior of the pipe or tube, into the end of which the plug is inserted and secured by rivets b c.

C are recesses formed in the projecting end of the plug B on opposite sides, as shown in Figs. 1, 4, and 5.

D are splines or keys secured in the end of the pipe-sections, to be joined on by rivets d or otherwise, so as to lie opposite to each other, as shown in Figs. 3 and 4, and of a dimension to fit the recesses C of the plug B, and the end of the pipe having the splines or keys D has in its wall or shell holes a', through which and the plug B a rivet, a, can be passed.

In practice the plug B is to be secured in one end of a pipe or tube section by the rivets b c, or in any other suitable and firm manner, leaving the portions having the groove C therein, and the other end of the pipe-section is to be provided with the splines or keys D. The pipe-sections are united one to the other by slipping the end of each section having the splines or keys therein onto the projecting portion of the plug B, bringing the two sections of pipe at the end together, as shown in Fig. 3, with the splines or keys D in the grooves or recesses C, after which the rivet a is passed through, preventing the withdrawal of the section.

The device is very simple in construction, but forms a firm and strong union between the two sections when united, and the sections are united one to the other very rapidly and without any great amount of labor or skill, as all that is required is to slip the open end of the section onto the projecting plug of the preceding section with the spline or key D in the grooves or recesses C and then inserting the rivet a.

The splines or keys D may be cast or formed with the pipe, instead of being made separate and riveted thereto.

What I claim as new, and desire to secure by Letters Patent, is—

1. The plug B, having one end formed full and the other end provided with recesses C, for uniting tube or pipe sections, substantially as specified.

2. The combination, with tube or pipe sections having one end provided with splines or keys, of the plug D, having the grooves or recesses C, substantially as and for the purposes specified.

3. The combination, with the tube or pipe sections having one end provided with splines or keys, of the plug D, having the grooves or recesses C, and securing-rivets a b c, substantially as specified.

JOHN W. TEETZEL.

Attest:
JAMES GENTLEMAN,
SAML. RICHOLSON.